W. PRICE.
Cultivator.
No 28,601
Patented June 5, 1860.
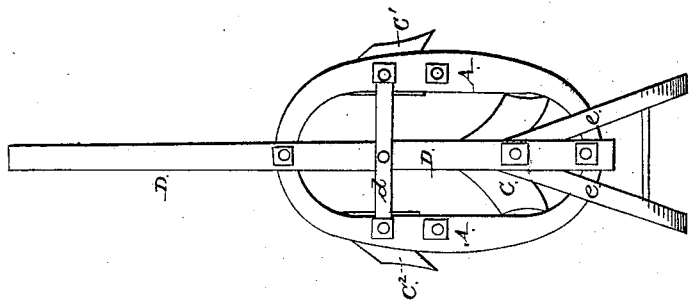
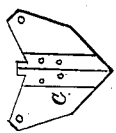
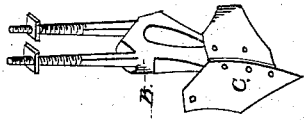
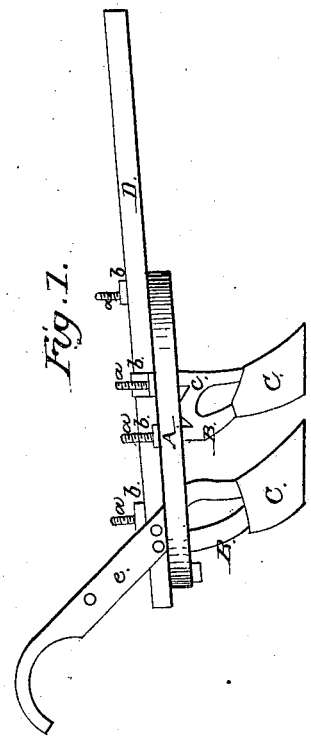
Witnesses:
Chas B Zuch,
Jno C Clayton
Inventor:
Whitman Price
by
J. Pigott atty

UNITED STATES PATENT OFFICE.

WHITMAN PRICE, OF WAYNE COUNTY, NORTH CAROLINA.

IMPROVEMENT IN PLOWS.

Specification forming part of Letters Patent No. 28,601, dated June 5, 1860.

*To all whom it may concern:*

Be it known that I, WHITMAN PRICE, of the county of Wayne, in the State of North Carolina, have invented a new and useful Gang or Single Turn-Plow; and I do hereby declare that the following is a full and exact description thereof, reference being had to the accompanying drawings, and to the letters of reference marked thereon.

The nature of my invention consists in the construction of the mold-board and bar and attaching the same to a circular beam, as hereinafter described.

To enable others skilled in the art to make and use my invention, I proceed to describe its construction and operation.

Figure 1 is a side view. Fig. 2 is a plan view. Fig. 3 is a section showing one of the standards and shovels. Fig. 4 is a section showing one of the shovels.

In the construction of my invention, in Fig. 1, A is the circular beam; B, the standards; C, the shovels; D, the beam; e, the handles; a, the screw on the upper end of the standards; b, the screw-nut.

In the different figures the like parts are designated by the same letters as in Fig. 1.

In the operation of my invention the mold-boards and bar, being cut out of the same piece of metal and made solid in the shape required, are attached to the standards B. These standards are so constructed that they can be adjusted so as to make the plow go deeper or shallower. This is accomplished by operating the screws a, screwing one down and the other up, allowing it to revolve on shoulder c, thus throwing the point of the plow deeper or shallower, as may be desired. The circular beam A is bolted to main beam D, and is braced by means of yoke d. (Seen in Fig. 2.) It operates as a gang-plow, with a right and left wing and a shovel, thus enabling me to plow between the rows, throwing up both sides and elevating the middle at the same time.

I may find it convenient to change the form of my shovels and use such as is seen in Fig. 4, or other shapes.

What I claim as new, and desire to secure by Letters Patent, is—

The arrangement of the circular beam A, the standards B, the shovels C, the main beam D, the handles e, the screw a on the upper end of the standards, and the screw-nut b, combined and operating as described, and for the purpose set forth.

WHITMAN PRICE.

Witnesses:
 THOMAS N. GRIFFIN,
 JENNINGS PIGOTT.